United States Patent [19]
Sakamoto et al.

[11] Patent Number: 5,499,143
[45] Date of Patent: Mar. 12, 1996

[54] ELECTROMAGNETIC ACTUATOR AND LENS DRIVE MECHANISM USING THE SAME

[75] Inventors: Satoshi Sakamoto, Tokyo; Eiji Ohshima, Kanagawa; Hiroshi Kawamura; Shinichi Orimo, both of Tokyo, all of Japan

[73] Assignee: Sony Corporation, Tokyo, Japan

[21] Appl. No.: 389,937

[22] Filed: Feb. 17, 1995

[30] Foreign Application Priority Data

Feb. 25, 1994 [JP] Japan .................................. 6-051121

[51] Int. Cl.⁶ .................................................. G02B 7/02
[52] U.S. Cl. .............................. 359/824; 359/822; 310/13
[58] Field of Search .................................. 359/822, 823, 359/824, 825, 830; 354/195.12; 310/13, 15

[56] References Cited

U.S. PATENT DOCUMENTS

| | | | |
|---|---|---|---|
| 4,948,235 | 8/1990 | Akitake | 359/823 |
| 4,961,635 | 10/1990 | Kondo et al. | 359/823 |
| 5,182,481 | 1/1993 | Sakamoto | 310/13 |
| 5,220,461 | 6/1993 | Inoue et al. | 359/824 |
| 5,225,941 | 7/1993 | Saito et al. | 359/824 |

*Primary Examiner*—Loha Ben
*Attorney, Agent, or Firm*—Ronald P. Kananen

[57] ABSTRACT

An electromagnetic actuator for moving a focusing lens along an optical axis includes a lens barrel having two supporting rails, a set of cylindrical inner and outer yokes incorporating a pair of magnets, a lens holder which holds the lens and is supported slidably on the supporting rails by means of a bearing device and rail guide provided on two arms of the lens holder, a coil wound on a bobbin which is fixed on the lens holder and located so that the coil is exposed to the magnetic field of the magnets inside the yokes. The yokes have cut portions, allowing the arms of lens holder to cut into the yokes when the lens is moved.

8 Claims, 6 Drawing Sheets

ELECTROMAGNETIC ACTUATOR AND
LENS DRIVE MECHANISM USING THE
SAME

BACKGROUND OF THE INVENTION

1. Field of the Invention

The present invention relates to an innovative electromagnetic actuator and a lens drive mechanism using the same. Specifically, the present invention is intended to provide an electromagnetic actuator which slides a movable member including a driven body of circular radial cross section in the axial direction inside a cylindrical casing, and provide a lens drive mechanism using the actuator. The inventive actuator and mechanism are suitably used for a drive mechanism for moving a focusing lens or zooming lens inside the lens barrel equipped on a video camera or the like. The inventive actuator and mechanism are designed to be compact by eliminating unneeded spaces, while exerting a large drive force based on the enhanced magnetic efficiency.

2. Description of Related Art

Generally, a video camera or the like having the auto-focusing function or electric zooming function has its lens barrel equipped with drive means for moving a movable lens of auto-focusing or zooming in the direction of its optical axis. Drive means of this kind often employ electromagnetic actuators including a set of a coil and a magnet.

FIGS. 6, 7 and 8 show an example of such electromagnetic actuators, which is used to move a focusing lens. The electromagnetic actuator indicated by "a" consists of a fixed member c disposed in a casing b having a shape of a rectangular cylinder, and a movable member d which is supported by being in non-contact with the fixed member c and slidable in the axial direction inside the casing b. The casing b is provided within it with two supporting rails e extending along two confronting corners and in parallel to the central axis of the casing b.

The fixed member c consists of a yoke member f made of magnetic material and magnets g fixed on the yoke member f. The yoke member f is an integrated member made up of an inner yoke h having a shape of rectangular cylinder which is smaller than the yoke member f, a connecting flange i which roots on the rear edge of the inner yoke h and extends outward, and four outer yokes j which root on the the outer edge of the connecting flange i and extend along the inner yoke h. Each magnet g is fixed on the inner side of the outer yoke j to face the inner yoke h. The magnets g produce a magnetic field k in the space between the magnets g and the inner yoke h.

The movable member d consists of a metallic frame 1 having a generally rectangular front face, with a relatively large circular opening being formed at the center, a lens holder m having a shape of circular cylinder which roots on the edge of the opening of the frame 1 and extends forward, a focusing lens n held by the lens holder m, and a coil bobbin o having a shape of rectangular cylinder which roots on the outer edge of the frame 1 and extends rearwardly.

The coil bobbin o has its radial cross-sectional dimensions made slightly larger than those of the inner yoke h and slightly smaller than the rectangle that is defined by the inner surfaces of the four magnets g. The coil bobbin o consists of a rear bobbin section p, with a groove being formed on its outer surface and a coil r being wound in the groove coaxially with the optical axis, and a connecting section q which connects the bobbin section p to the frame 1.

Indicated by s is one of two support arms extending radially in diagonal directions from the outer surface of the lens holder m and reach radial positions beyond that of the corners of the frame 1. Bearing sections t are formed in the arms at the positions corresponding to the supporting rails e. The support arms s engage with the supporting rails e by means of the bearing sections t so that the movable member d is supported slidably in the direction of the optical axis inside the casing b, with the coil bobbin o and coil r being exposed to the magnetic field k produced between the inner yoke h and magnets g. When a drive current is supplied to the coil r, a drive force is generated in a direction depending on the current direction, and the movable member d moves in the direction of optical axis.

However, the foregoing conventional electromagnetic actuator necessitates the connecting section q of the coil bobbin o for providing a clearance so that the frame 1 of the movable member d does not hit the front end of the yoke member f when the coil r is brought to the rearmost position in its moving range, thereby resulting unfavorably in an increased axial dimension of the movable member d. Consequently, the focusing lens n appears to come out forward too much when the movable member d is located at the foremost position in its moving range, resulting unfavorably in an increased axial dimension of the overall electromagnetic actuator.

Moreover, the fixed member c and movable member d having a rectangular radial cross section take an extra volume for their corner sections, which do not match with the focusing lens n having a circular radial cross section, and hinder the compact and light-weight design. Due to the fixed member of this shape, four divided magnets must be used, thus hindering the improvement of the magnetic efficiency.

Moreover, the planar outer yokes j extending from the outer edge of the connecting flange i are liable to bend at the root, and in this event the movable member d may come to contact with a bent outer yoke j. Although a conceivable precautionary design is to allow much clearance between the inner yoke h and outer yokes j, an excessive clearance will deteriorate the magnetic efficiency and thus reduce the drive force. This problem is more pronounced as the moving range of the movable lens is increased, and therefore it is difficult for this structure to be applied to lens systems having a long moving range, such as a zoom lens system, or it is difficult to accomplish a zoom lens system having a high magnification factor.

Moreover, the coil bobbin o having a rectangular radial cross section is liable to cause the coil r to stray from the bobbin surface at its linear sections, and in this event the coil r may come to contact with the inner yoke h.

The foregoing prior art problems are more pronounced as the moving range of the movable member d is increased, and it has been desired to dissolve these problems.

SUMMARY OF THE INVENTION

Accordingly, an object of the present invention is to provide an electromagnetic actuator which is compact and light-weight and produces a large drive force.

Another object of the present invention is to provide a lens drive mechanism which is compact and light-weight and produces a large drive force based on the electromagnetic actuator.

The electromagnetic actuator of the present invention comprises a cylindrical casing having a first supporting rail extending in parallel to the central axis of the casing, a yoke member which is disposed in the casing and made up of a cylindrical inner yoke having a first cut portion opening in the direction parallel to the central axis and a cylindrical outer yoke covering the inner yoke, a pair of magnets fixed on the yoke member, a holding member which holds a driven body having a generally circular radial cross section, a cylindrical coil bobbin which is greater in diameter than the driven body holding member, with a coil being wound thereon coaxially, a first connecting arm which connects the coil bobbin to the driven body holding member in a generally concentric relation and is located in the first cut portion of the inner yoke, and a bearing device provided on the first connecting arm or the driven body holding member and supported slidably on the first supporting rail.

The lens drive mechanism for moving a lens electromagnetically based on the present invention comprises a lens barrel having a first supporting rail extending in parallel to the optical axis of the lens, a yoke member which is disposed inside said lens barrel and made up of a cylindrical inner yoke having a first cut portion extending in the direction parallel to the optical axis and a cylindrical outer yoke covering the inner yoke, a pair of magnets fixed on the yoke member, a lens holder which holds the lens, a cylindrical coil bobbin having a diameter greater than that of the lens holder, with a coil being wound coaxially on the bobbin, a first connecting arm which connects the coil bobbin to the lens holder in a generally concentric relation and is located in the first cut portion of the inner yoke, and a bearing device provided on the first connecting arm or the lens holder and supported slidably on the first supporting rail.

According to the inventive electromagnetic actuator, a cut portion is formed on at least the inner yoke, the driven body holding member and coil bobbin are connected through the connecting arm, and the connecting arm is put into the cut portion of the inner yoke so that the coil and coil bobbin are exposed to the magnetic field. Consequently, the coil can be immediately adjacent to the driven body holding member, instead of needing a clearance for preventing the movable member from hitting against the fixed member, allowing the movable member to have a reduced axial dimension, whereby the overall electromagnetic actuator can be made compact.

Moreover, the yoke member and coil bobbin are designed to have an annular cross section. Consequently, the unneedful volume of the four corner sections in the case of the conventional fixed and movable members is eliminated, whereby their size and weight can be reduced, and only two divided magnets, instead of four, can be used on the fixed member, whereby the magnetic efficiency can be improved.

Moreover, the inner and outer yokes are formed in a cylindrical shape which is durable against bending at the connecting section after the fabrication, allowing the reduction of the spacing between the inner and outer yokes, whereby the magnetic efficiency can be improved and the drive force can be increased.

Moreover, owing to the coil bobbin having an annular cross section, the coil can be wound in tight contact with the bobbin surface, allowing the reduction of the spacing between the inner and outer yokes, whereby the efficiency of drive force generation can be improved.

Based on the above-mentioned improvements of the electromagnetic actuator, a lens drive mechanism which is compact and light-weight and has a large drive force can be offered.

DESCRIPTION OF THE PREFERRED EMBODIMENT

Figure 1:
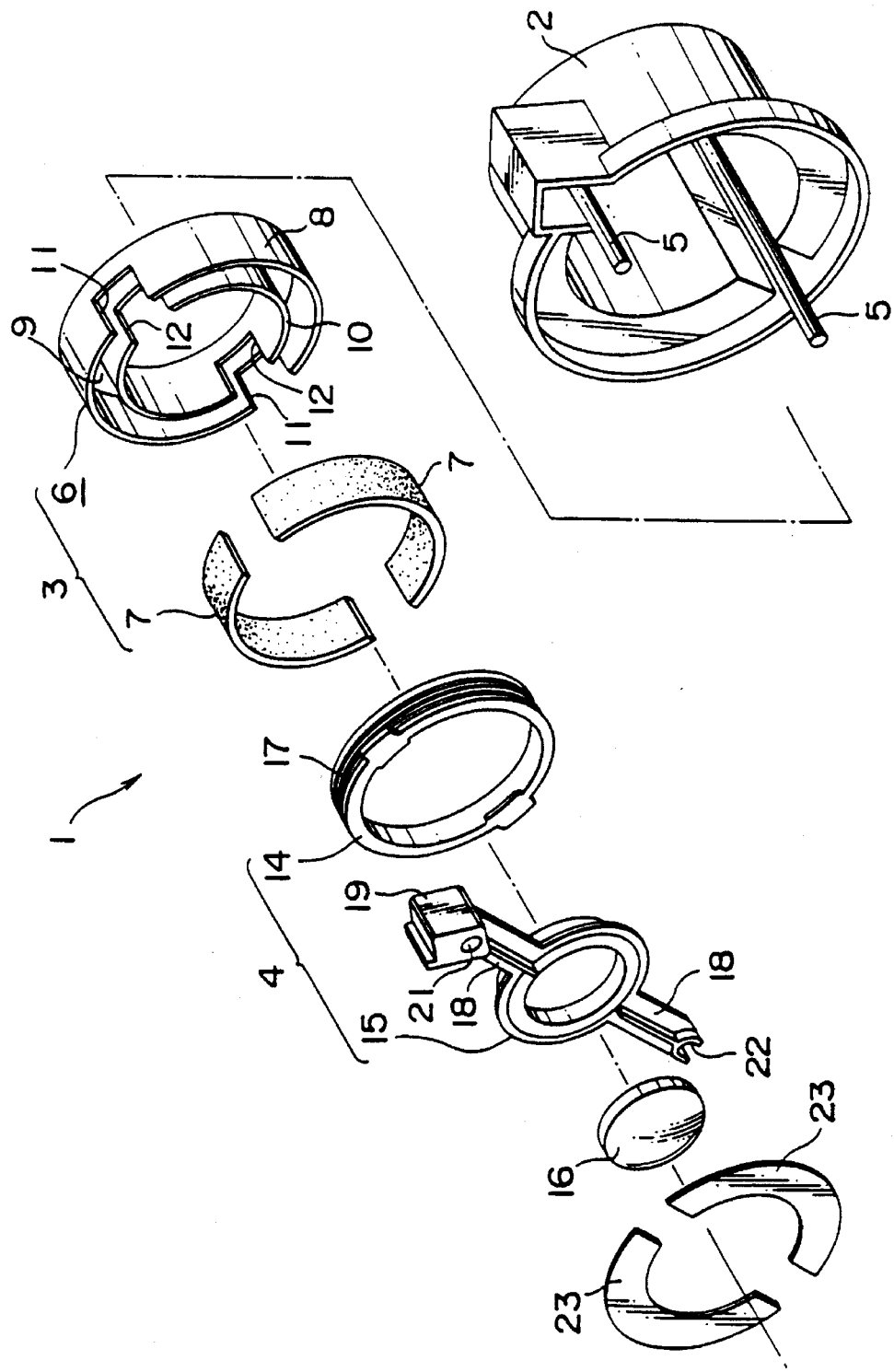
FIG. 1 is a perspective exploded view of an electromagnetic actuator based on an embodiment of this invention which is applied to a focusing lens drive mechanism.
Figure 2:
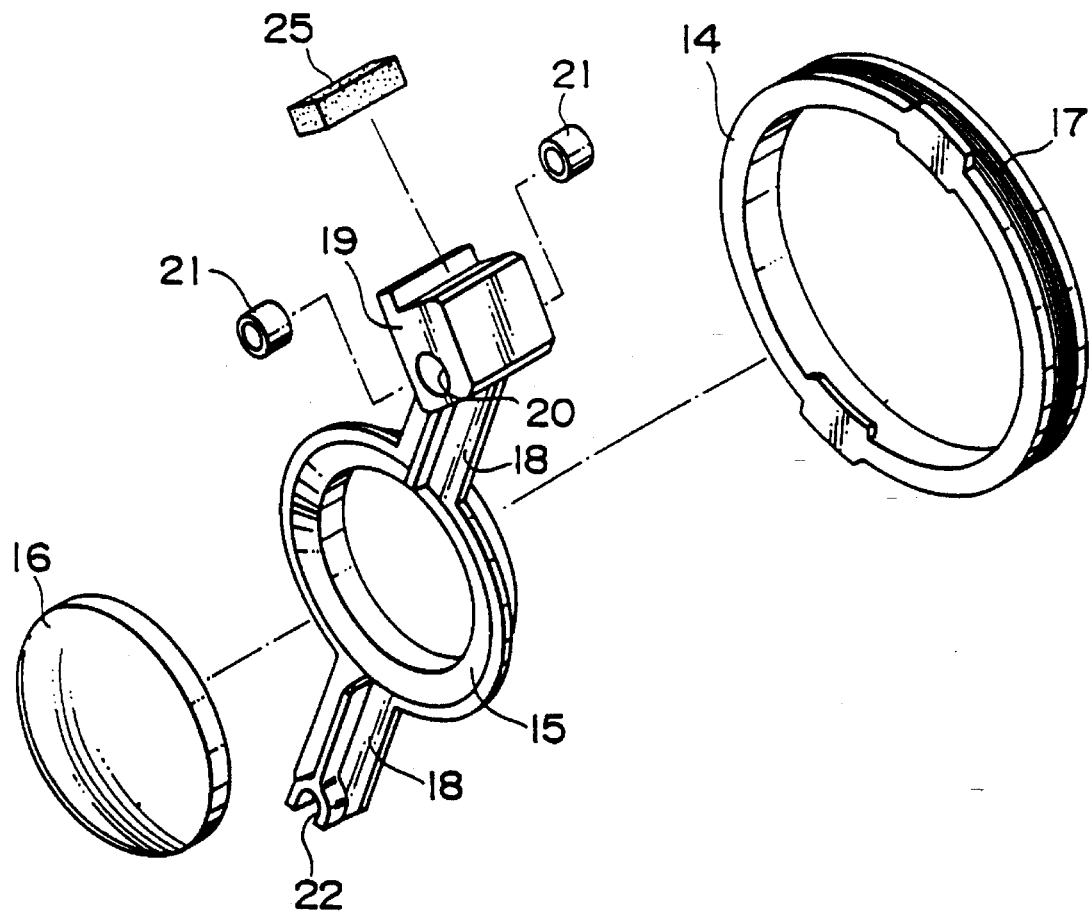
FIG. 2 is a perspective exploded view showing the principal component parts of the actuator.
Figure 3:
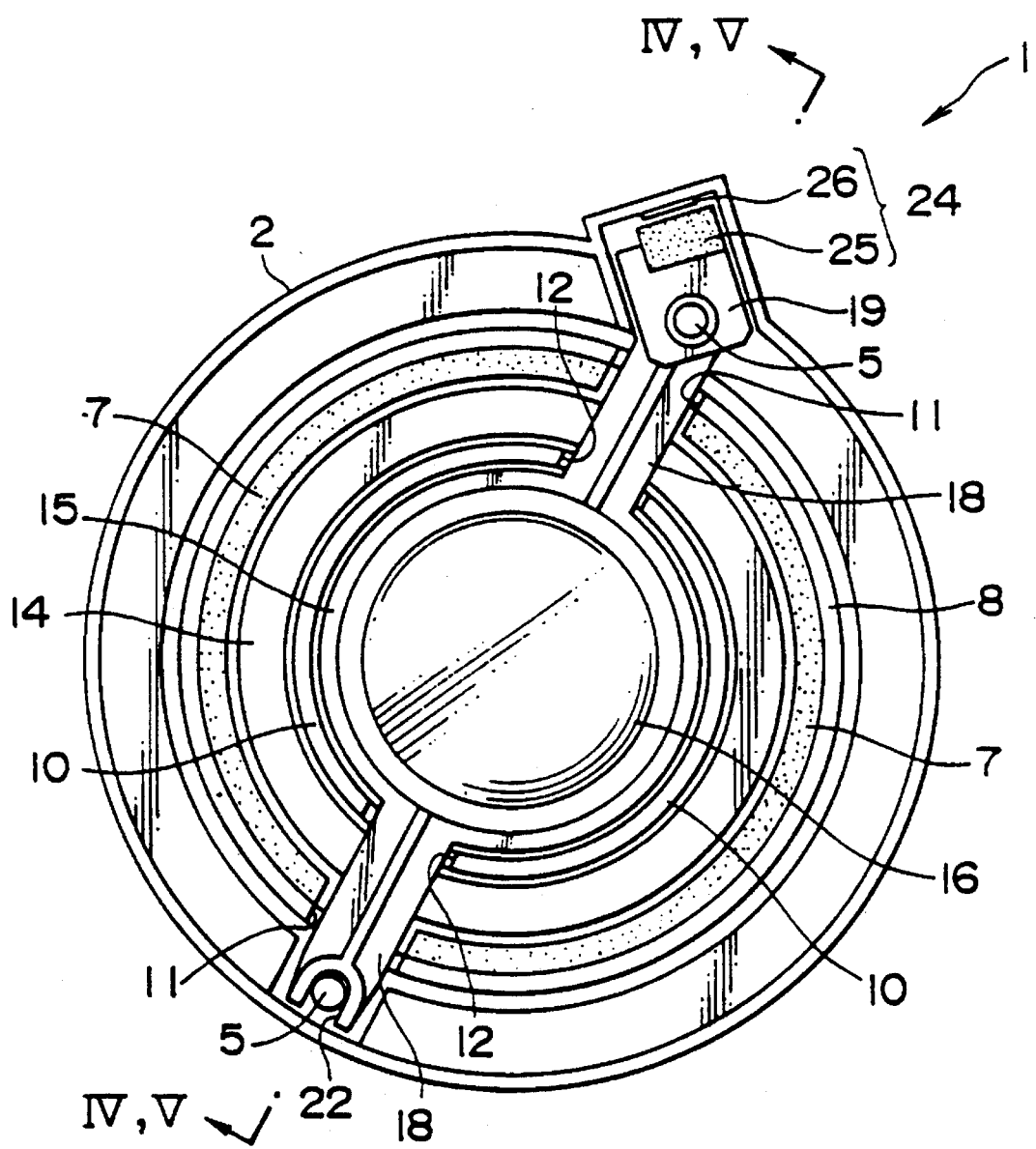
FIG. 3 is a front view of the actuator.
Figure 4:
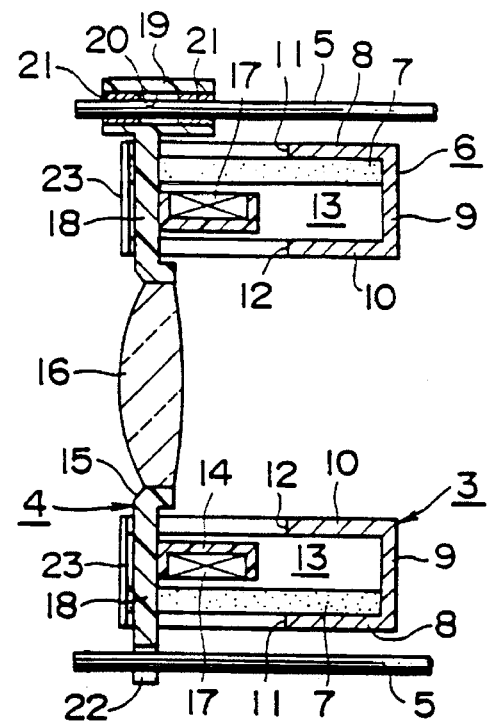
FIG. 4 is a cross-sectional view taken along the line IV—IV of FIG. 3, with the focusing lens being located at the foremost position.
Figure 5:
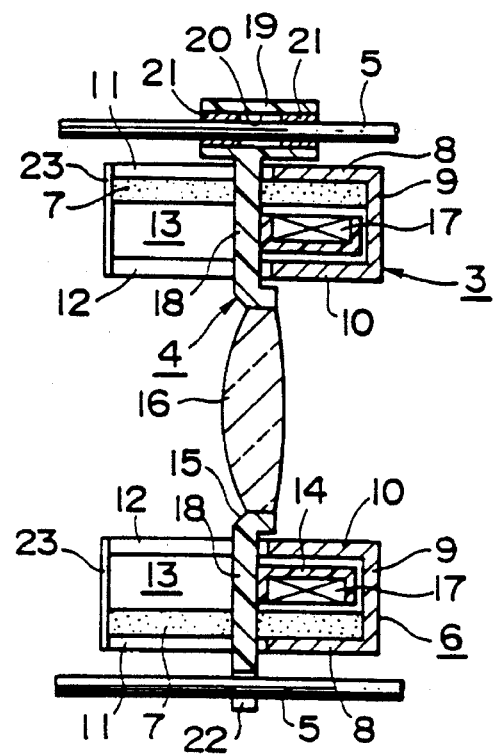
FIG. 5 is a cross-sectional view taken along the line V—V of FIG. 3, with the focusing lens being located at the rearmost position.
Figure 6:
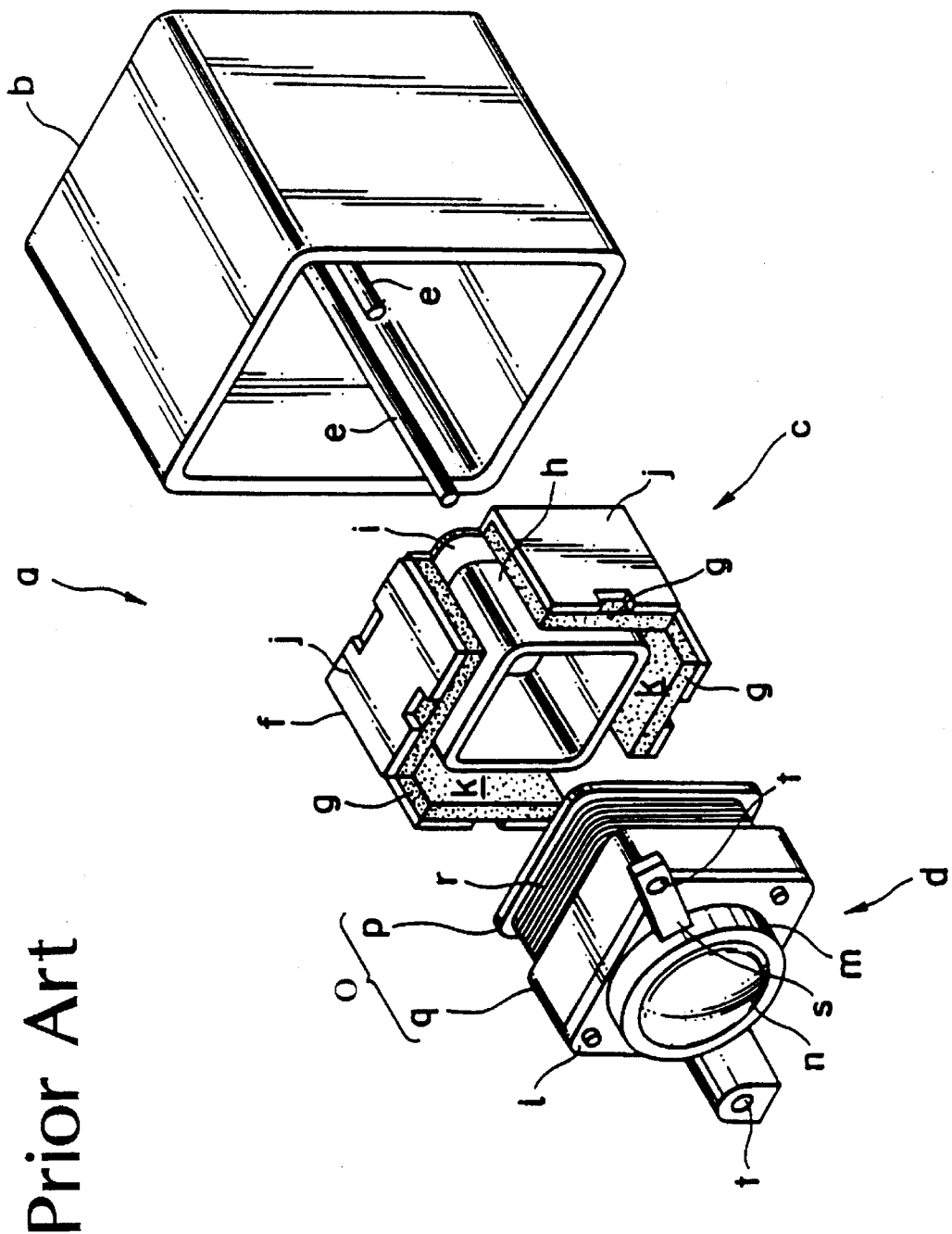
FIG. 6 is a exploded view diagram showing an example of the conventional electromagnetic actuator.
Figure 7:
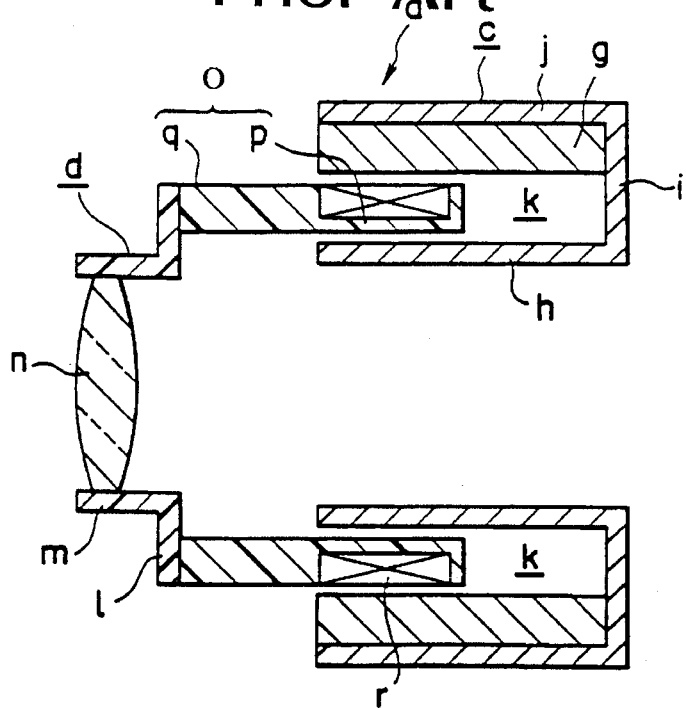
FIG. 7 is a cross-sectional view of the conventional actuator, with the lens being located at a foremost position.
Figure 8:
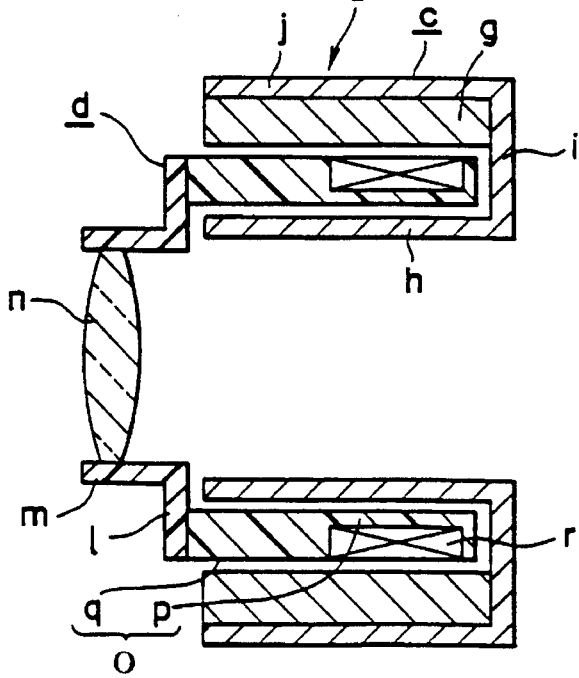
FIG. 8 is a cross-sectional view of the conventional actuator, with the lens being located at a rearmost position.

The electromagnetic actuator and the lens drive mechanism using the actuator based on an embodiment of this invention will be explained in detail with reference to the drawings. This embodiment is a application of the electromagnetic actuator to the focusing lens drive mechanism for the inner focusing unit equipped within the lens barrel of a video camera or the like.

The electromagnetic actuator indicated by 1 consists of a fixed member 3 disposed in a cylindrical lens barrel 2, and a movable member 4 which is supported by being in non-contact with the fixed member 3 and slidable in the axial direction inside the lens barrel 2. The lens barrel 2 is provided in it with two supporting rails 5 of circular cross section located close to but in non-contact with the interior surface at the positions spaced out from each other by a sector angle of 180° and extending in parallel to the optical axis of the lens barrel 2. The supporting rails 5 are fixed on internal flanges (not shown) which root on the rear end of the lens barrel 2 and extend forward. The lens barrel 2 may have a shape of square cylinder, instead of circular cylinder.

The fixed member 3 consists of a yoke member 6 made of magnetic material and a pair of magnets 7 fixed on the yoke member 6. The yoke member 6 is a unitary member consisting of a cylindrical outer yoke 8 which is slightly smaller in diameter than the lens barrel 2, a connecting flange 9 which roots on the rear edge of the outer yoke 8 and extends forward, and a cylindrical inner yoke 10 which roots on the inner face of the flange 9 and extends along the outer yoke 8. These yokes 8 and 10 have the formation of cuts 11 and 12 opening in the forward direction at the positions spaced out from each other by 180° with respect to the central axis.

The pair of cuts 11 are located at the opposite positions with respect to the central axis and the pair of cuts 12 are located at the opposite positions with respect to the central axis, with each set of cuts 11 and 12 being radially coincident.

The yoke member 6 is manufactured by forming from a sheet of metal so that the outer yoke 8, connecting flange 9 and inner yoke 10 are formed as a unitary member. Alternatively, these individual parts may be formed separately and joined together by welding or the like. Owing to the cylindrical shape, the outer yoke 8 and inner yoke 10 are prevented from being bent and having their spacing varied after the fabrication.

Each magnet 7 has an arciform cross section, and is magnetized to have opposite poles on the inner and outer sides. The magnets 7 are fixed on the inner surface of the outer yoke 8, and a magnetic field 13 is produced in the space between the magnets 7 and the inner yoke 10. The complete fixed member 3 is fixed in the lens barrel 2, with the cuts 11 of the outer yoke 8 being located to confront the supporting rails 5.

The movable member 4 mainly consists of a thin cylindrical coil bobbin 14, an annular lens holder 15 which is smaller in diameter than the bobbin 14, and a focusing lens 16 held by the lens holder 15.

The coil bobbin 14 has the formation of a groove on its outer circumferential surface excluding the edge sections, and a coil 17 is wound in the groove. The coil bobbin 14 has an inner diameter made slightly greater than the outer diameter of the inner yoke 10 and the bobbin 14 with the coil 17 wound thereon has an outer diameter made slightly smaller than the inner diameter of the magnets 7, so that the bobbin 14 and coil 17 are exposed to the magnetic field 13 in non-contact with the inner yoke 10 and magnets 7.

The lens holder 15 has an outer diameter made slightly smaller than the inner diameter of the inner yoke 10, and has the formation of two connecting arms 18 which root on the front edge at the positions spaced out from each other by a sector angle of 180° and extend outward in the radial directions. The connecting arms 18 have a width seen from the front made slightly smaller than the width of the cuts 11 and 12 formed in the outer and inner yokes 8 and 10.

One connecting arm 18 has at its end the unitary formation of a bearing block 19, with a bore 20 being formed in the axial direction. A pair of bearing metals 21 are press-fitted at both ends of the bore 20. Another connecting arm 18 has at its end the formation of a U-shaped rail guide opening outward seen from the front. The distance between the center of the bore 20 of the bearing block 19 and the center of the rail guide 22 is set virtually equal to the distance between the supporting rails 5 of the lens barrel 2.

The coil bobbin 14 is fixed by means of a bonding agent, for example, to the rear face of the connecting arms 18 so that the lens holder 15 and coil bobbin 14 are joined coaxially. Alternatively, the lens holder 15 and coil bobbin 14 may be formed as a unitary member from the beginning. Consequently, the focusing lens 16 is located at the front end of the coil bobbin 14.

The movable member 4 is brought into the lens barrel 2, in which the fixed member 3 is already placed, as follows. The connecting arms 18 of the movable member 4 are put into the cuts 11 and 12 of the outer and inner yokes 8 and 10, and at the same time the bearing metals 21 of the bearing block 19 on one connecting arm 18 and the rail guide 22 on another connecting arm 18 are fitted onto the respective supporting rails 5. Consequently, the movable member 4 is supported slidably in the direction of optical axis inside the lens barrel 2, with the coil 17 wound on the coil bobbin 14 being exposed to the magnetic field 13 and the focusing lens 16 held by the lens holder 15 being located inside the inner yoke 10.

The movable member 4 is supported in the lens barrel 2 mainly through the engagement of the bearing block 19 with one supporting rail 5, and the rail guide 22 which engages with another supporting rail 5 serves to prevent the movable member 4 from turning around the axis.

It is possible to replace the two supporting rails 5 having a circular cross section with a single supporting rail 5 having a cross section of other shape such as an elongated circle.

Moreover, the supporting rails 5 that are located outside of the outer yoke 8 in the foregoing embodiment of invention may be located inside of the inner yoke 10, in which case cuts are formed only in the inner yoke and the bearings may be formed directly in the lens holder instead of using connecting arms.

Indicated by 23 are a pair of subsidiary yokes made of magnetic material and each having a shape of semicircular arch. The subsidiary yokes 23 are attached to bridge the outer and inner yokes 8 and 10 thereby to close their open ends at the front of the fixed member 3 after the movable member 4 has been brought in it. The attachment of the subsidiary yokes 23 to the yoke member 6 is made possible through the disposition of the lens holder 15 and focusing lens 16 inside of the inner yoke 10, with the connecting arms 18 being put into the cuts 11 and 12.

Consequently, a magnetic flux produced by the magnets 7 are propagated through closed magnetic circuits formed of the outer yoke 8, connecting flange 9, subsidiary yokes 23, and inner yoke 10, with the coil 17 wound on the coil bobbin 14 being located in the closed magnetic circuit. Although the subsidiary yokes 23 are not essential elements, they serves to split the magnetic flux from the outer yoke 8 to the connecting flange 9 and to the subsidiary yokes 23 so that the magnetic flux density is not saturated, and consequently it becomes possible to use powerful magnets for attaining a large drive force without much increasing the thickness of yoke.

When a drive current is supplied to the coil 17, it generates a magnetic flux in a direction depending on the current direction. A resulting drive force acts on the coil 17 in the axial direction, and the lens holder 15 and lens 16 are moved.

Indicated by 24 is a means of detecting the position of the lens holder 15, and it consists of a moving magnet (MR magnet) 25 attached on the bearing block 19 formed at the end the connecting arm 18 of the movable member 4 and a magnetic resistance element (MR sensor) 26 having an axial length which covers the moving range of the MR magnet 25 and is attached on the inner surface of the lens barrel 2. The MR magnet 25 is magnetized to have alternate poles in the axial direction. The movement of the MR magnet 25 following the movement of the lens holder 15 causes the MR sensor 26 to have its resistance value varied due to the variation of the magnetic flux density acting on it, and by counting transitions of resistance value, the position of the lens holder 15 is detected.

The position detecting means 24 may be another known device consisting of a tapered magnet and a Hall-effect element, for example.

The magnets 7 having opposite poles in the radial direction and the single-phase coil 17 of the foregoing embodiment may be replaced with magnets that are magnetized to have multiple poles aligning alternately along the optical axis and coils of two phases or more with current supplies in alternate opposite directions aligning along the optical axis so as to form a multi-phase linear motor. In this case, closed magnetic circuits are formed through the adjoining magnets of opposite polarities and the confronting yokes, preventing the magnetic flux from concentrating to the connecting flange between the outer and inner yokes, whereby the yoke member can be made thinner and lighter and an electromagnetic actuator having a large axial dimension can be designed.

In the case of the multi-phase linear motor, where the magnetic fluxes passing through the coils vary as the coils move, the direction of the current supplied to each coil is switched depending on the direction of magnetic flux. In the case of 4-phase coils, four separate wires may be coiled, with currents of opposite directions being supplied thereto, or a single wire may be coiled in one direction at the beginning and then in the opposite direction from the mid point, with a current being supplied thereto.

Although the foregoing embodiment is a drive mechanism for a movable lens (focusing lens) of the inner focusing unit equipped in the lens barrel of a video camera or the like, the present invention is also applicable to a zoom lens drive mechanism, a dual-axis actuator which moves a lens block in one direction in an optical pickup instrument, or general moving apparatus for moving arbitrary elements.

In case the inventive electromagnetic actuator is applied to a dual-axis actuator for moving a lens block in one direction, it is possible to dispose the objective lens of the lens block to confront the cuts formed in the yoke member.

Although in the foregoing embodiment only one of the two connecting arms has the formation of a bearing device, with another arm having the formation of a rail guide, the present invention is not confined to this arrangement, but it is intended to have the formation of bearing device on one or both of the connecting arms.

The specific shape and structure of the component parts of the foregoing embodiment are only examples in practicing the lens drive mechanism by use of the electromagnetic actuator, and the scope of the present invention is not limited by these examples.

What is claimed is:

1. An electromagnetic actuator comprising:

a cylindrical casing having a first supporting rail extending in parallel to the central axis of said casing;

a yoke member which is disposed in said casing and made up of a cylindrical inner yoke having a first cut portion opening in the direction parallel to the central axis and a cylindrical outer yoke covering said inner yoke;

a magnet fixed on said yoke member;

a holding member which holds a driven body having a generally circular radial cross section;

a cylindrical coil bobbin which is greater in diameter than said driven body holding member, with a coil being wound thereon coaxially;

a first connecting arm which connects said coil bobbin to said driven body holding member in a generally concentric relation and is located in the first cut portion of said inner yoke; and a bearing device which is provided on said first connecting arm or said driven body holding member and supported slidably on said first supporting rail.

2. An electromagnetic actuator according to claim 1, wherein said first supporting rail is located outside of said yoke member, said outer yoke has a second cut portion opening in the direction parallel to the central axis, said first and second cut portions being located to confront said first supporting rail, and said bearing device is formed at the outer end of said first connecting arm.

3. An electromagnetic actuator according to claim 2, wherein said casing has a second supporting rail extending in parallel to the central axis of said casing, said inner yoke has a third cut portion confronting said second supporting rail, said outer yoke has a fourth cut portion confronting said second supporting rail, and said magnet consists of two magnets fixed on said yoke member at positional sections that do not include the first, second, third and fourth cut portions, and wherein said actuator further includes a second connecting arm which connects said coil bobbin to said driven body holding member in a generally concentric relation and is located in the third and fourth cut portions of said yoke member.

4. An electromagnetic actuator according to claim 3, wherein said first and second supporting rails are located at generally opposite positions with respect to the central axis of said casing, and said second connecting arm has at the outer end thereof the formation of a rail guide which engages with said second supporting rail slidably.

5. A lens drive mechanism for moving a lens electromagnetically comprising:

a lens barrel having a first supporting rail extending in parallel to the optical axis of said lens;

a yoke member which is disposed inside said lens barrel and made up of a cylindrical inner yoke having a first cut portion extending in the direction parallel to the optical axis and a cylindrical outer yoke covering said inner yoke;

a magnet fixed on said yoke member;

a lens holder which holds said lens;

a cylindrical coil bobbin which is greater in diameter than said lens holder, with a coil being wound thereon coaxially;

a first connecting arm which connects said coil bobbin to said lens holder in a generally concentric relation and is located in the first cut portion of said inner yoke; and a bearing device which is provided on said first connecting arm or said lens holder and supported slidably on said first supporting rail.

6. A lens drive mechanism according to claim 5, wherein said first supporting rail is located outside of said yoke member, said outer yoke has a second cut portion opening in the direction parallel to the optical axis, said first and second cut portions being located to confront said first supporting rail, and said bearing device is formed at the outer end of said first connecting arm.

7. A lens drive mechanism according to claim 6, wherein said lens barrel has a second supporting rail extending in parallel to the optical axis, said inner yoke has a third cut portion confronting said second supporting rail, said outer yoke has a fourth cut portion confronting said second supporting rail, and said magnet consists of two magnets fixed on said yoke member at positional sections that do not include the first, second, third and fourth cut portions, and wherein said lens drive mechanism further includes a second connecting arm which connects said coil bobbin to said lens holder in a generally concentric relation and is located in the third and fourth cut portions of said yoke member.

8. A lens drive mechanism according to claim 7, wherein said first and second supporting rails are located at generally opposite positions with respect to the optical axis, and said second connecting arm has at the outer end thereof the formation of a rail guide which engages with said second supporting rail slidably.

* * * * *